(12) United States Patent
Dayton

(10) Patent No.: US 9,132,869 B2
(45) Date of Patent: Sep. 15, 2015

(54) AERODYNAMIC DRAG REDUCTION SYSTEM

(71) Applicant: Roderick M Dayton, Strongsville, OH (US)

(72) Inventor: Roderick M Dayton, Strongsville, OH (US)

( * ) Notice: Subject to any disclaimer, the term of this patent is extended or adjusted under 35 U.S.C. 154(b) by 0 days.

(21) Appl. No.: 13/675,205

(22) Filed: Nov. 13, 2012

(65) Prior Publication Data

US 2013/0119701 A1   May 16, 2013

Related U.S. Application Data

(60) Provisional application No. 61/557,967, filed on Nov. 10, 2011.

(51) Int. Cl.
*B62D 35/02* (2006.01)
*B62D 35/00* (2006.01)

(52) U.S. Cl.
CPC .............. *B62D 35/02* (2013.01); *B62D 35/001* (2013.01)

(58) Field of Classification Search
CPC ........................................................ B62D 35/02
USPC ............................................ 296/180.4, 180.1
See application file for complete search history.

(56) References Cited

U.S. PATENT DOCUMENTS

| | | | |
|---|---|---|---|
| 2,642,163 A | 6/1953 | Movey et al. | |
| 2,795,076 A | 6/1957 | Luft | |
| 3,010,754 A | 11/1961 | Shumaker | |
| 3,524,672 A | 8/1970 | Rawings | |
| 3,775,917 A | 12/1973 | Struben | |
| 3,960,402 A | 6/1976 | Keck | |
| 4,262,953 A | 4/1981 | McErlane | |
| 4,421,354 A | 12/1983 | Lemaster | |
| 4,486,046 A | 12/1984 | Whitney et al. | |
| 4,585,262 A | 4/1986 | Parks | |
| 4,640,541 A | 2/1987 | FitzGerald et al. | |
| 4,659,130 A | 4/1987 | Dimora et al. | |

(Continued)

FOREIGN PATENT DOCUMENTS

| CA | 2642163 | 1/2009 |
|---|---|---|
| DE | 10315885 A1 | 11/2004 |

(Continued)

OTHER PUBLICATIONS

International Search Report for PCT/US2009/034662 (Publication No. WO2009105631) dated Sep. 15, 2009.

*Primary Examiner* — Joseph D Pape
*Assistant Examiner* — Dana Ivey
(74) *Attorney, Agent, or Firm* — Pearne & Gordon LLP

(57) ABSTRACT

Provided is an aerodynamic drag reduction apparatus for reducing aerodynamic drag on an over-the-road vehicle while underway. The aerodynamic drag reduction system includes a frame assembly that is adapted to cooperate with a cargo-carrying portion of the over-the-road vehicle to couple the drag reduction apparatus to the over-the-road vehicle. First and second skirts are adapted to be supported beneath opposite lateral sides of the cargo-carrying portion of the over-the-road vehicle by arcuate rails. The first and second skirts are coupled to the frame assembly in a manner that allows thermal expansion and contraction of the first and second skirts relative to the frame assembly without warping of material forming an air-deflecting surface of the first and second skirts to an extent that would otherwise occur if the first and second skirts were fixedly connected to the frame assembly.

16 Claims, 9 Drawing Sheets

(56) References Cited

U.S. PATENT DOCUMENTS

| | | |
|---|---|---|
| 4,877,266 A | 10/1989 | Lamparter et al. |
| 4,902,067 A | 2/1990 | Sakai et al. |
| 4,938,524 A | 7/1990 | Straub et al. |
| 5,280,990 A | 1/1994 | Rinard |
| 5,375,882 A | 12/1994 | Koch, III |
| D357,726 S | 4/1995 | Furomoto |
| 5,419,608 A | 5/1995 | Takemoto |
| 5,921,617 A | 7/1999 | Loewen |
| 6,079,769 A | 6/2000 | Fannin et al. |
| 6,109,639 A | 8/2000 | Blassingame et al. |
| 6,257,654 B1 | 7/2001 | Boivin et al. |
| 6,453,627 B1 | 9/2002 | Powers |
| 6,644,700 B2 | 11/2003 | Ito et al. |
| 6,685,256 B1 | 2/2004 | Shermer |
| D499,679 S | 12/2004 | Perfetti et al. |
| 6,837,536 B1 | 1/2005 | Schwartz |
| 6,846,035 B2 | 1/2005 | Wong et al. |
| 6,974,178 B2 | 12/2005 | Ortega et al. |
| 7,008,005 B1 | 3/2006 | Graham |
| 7,040,690 B2 | 5/2006 | Soja et al. |
| 7,055,891 B2 | 6/2006 | Jungert |
| 7,093,889 B2 | 8/2006 | Graham |
| 7,144,075 B2 | 12/2006 | Shishikura |
| 7,163,258 B2 | 1/2007 | Dyer, II |
| 7,240,958 B2 | 7/2007 | Skopic |
| 7,578,541 B2 * | 8/2009 | Layfield et al. ............ 296/180.2 |
| 7,748,772 B2 | 7/2010 | Boivin et al. |
| 7,762,615 B2 | 7/2010 | Dayton |
| 7,789,453 B2 | 9/2010 | Roush et al. |
| 7,854,469 B2 | 12/2010 | Dayton |
| 7,887,120 B2 | 2/2011 | Boivin et al. |
| 7,938,475 B2 | 5/2011 | Boivin et al. |
| 7,942,466 B2 * | 5/2011 | Reiman et al. ............ 296/180.4 |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,992,666 B2 * | 8/2011 | Otterstrom .................. 180/69.6 |
| 7,992,923 B2 | 8/2011 | Dayton |
| 8,177,286 B2 | 5/2012 | Brown et al. |
| 8,366,180 B2 | 2/2013 | Lee et al. |
| 8,413,937 B2 | 4/2013 | Di Franco |
| 2005/0146161 A1 | 7/2005 | Uland |
| 2006/0252361 A1 | 11/2006 | Henderson, II |
| 2009/0218848 A1 * | 9/2009 | Boivin et al. ............ 296/180.4 |
| 2010/0264690 A1 | 10/2010 | Brown et al. |
| 2011/0062749 A1 * | 3/2011 | Graham et al. ............ 296/180.4 |
| 2012/0091754 A1 | 4/2012 | Lee et al. |
| 2012/0235441 A1 | 9/2012 | Dayton |

FOREIGN PATENT DOCUMENTS

| | | |
|---|---|---|
| FR | 2538767 A1 | 7/1984 |
| JP | 2007253657 | 10/2007 |
| JP | 2008013013 | 1/2008 |
| WO | 2009105631 | 8/2008 |

* cited by examiner

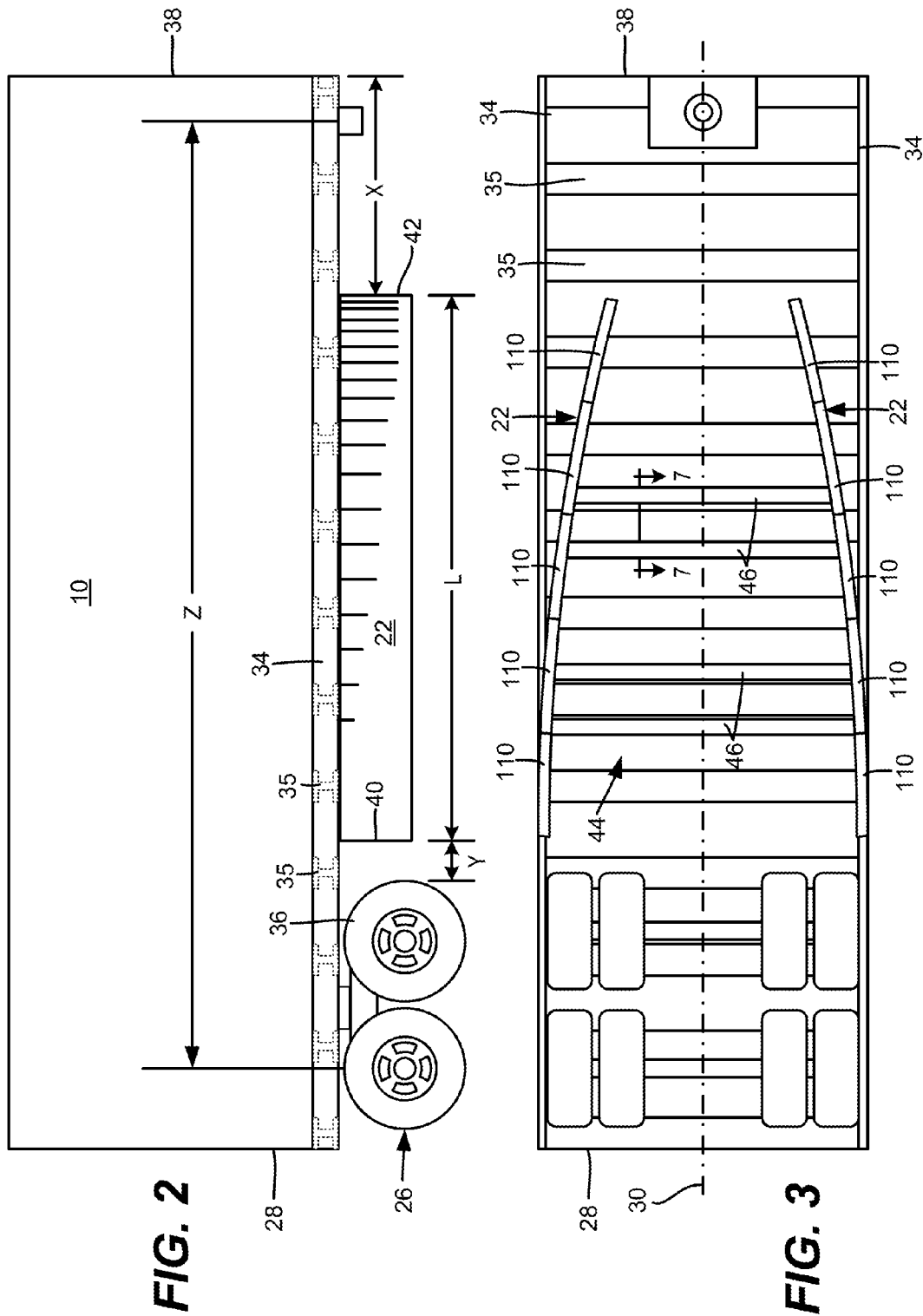

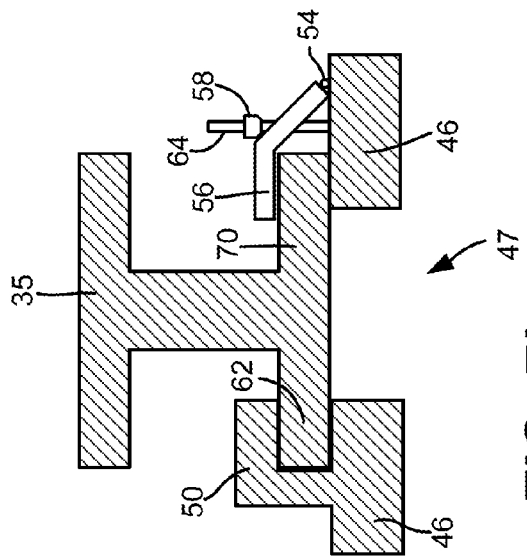
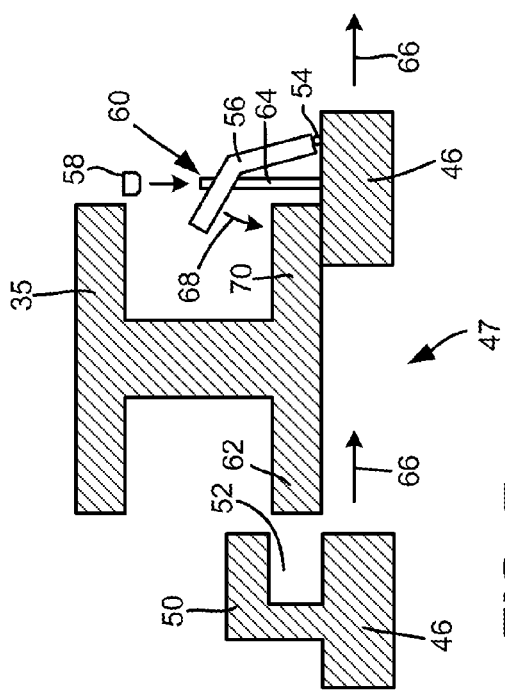
FIG. 7a
FIG. 7b

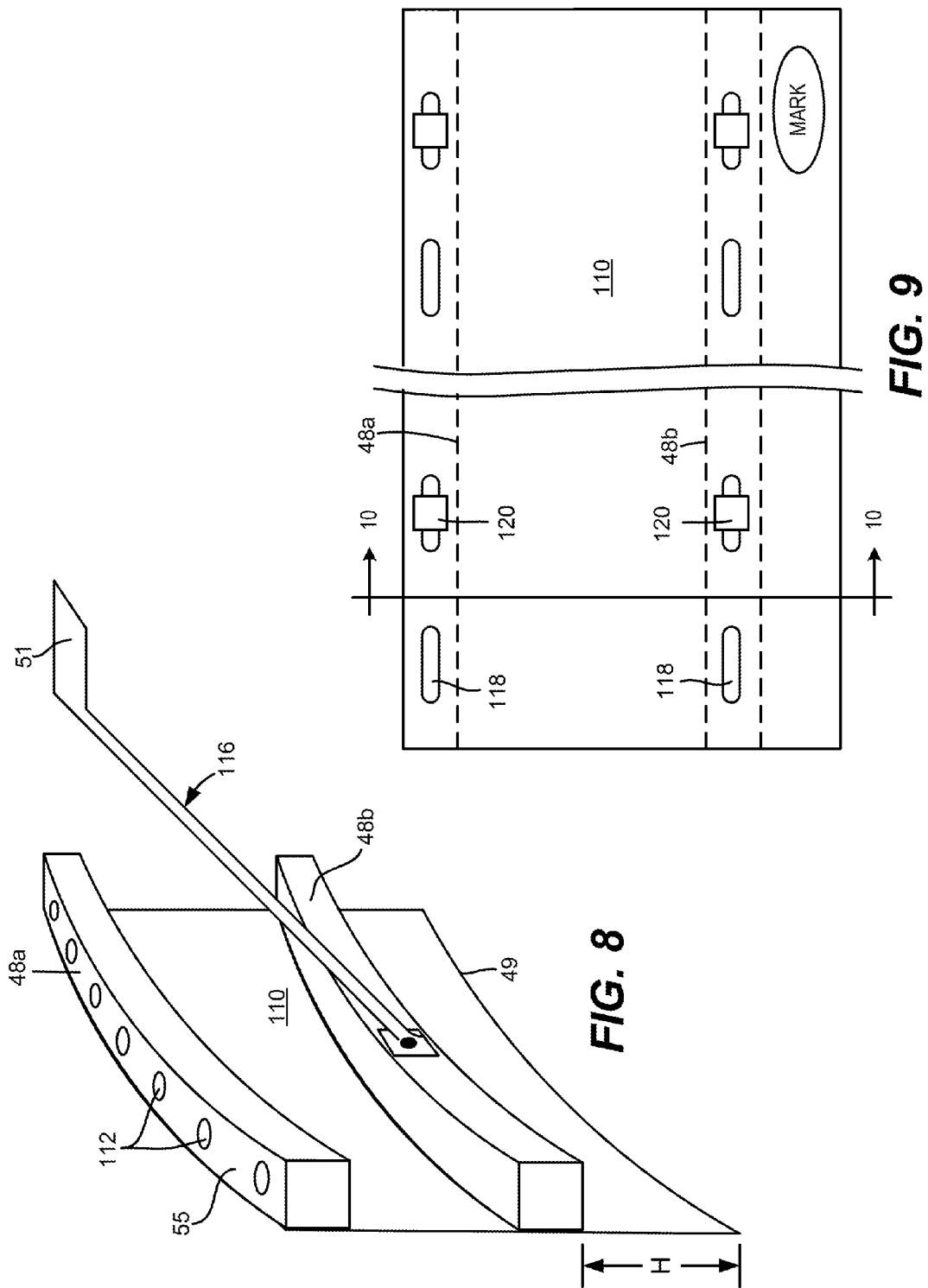

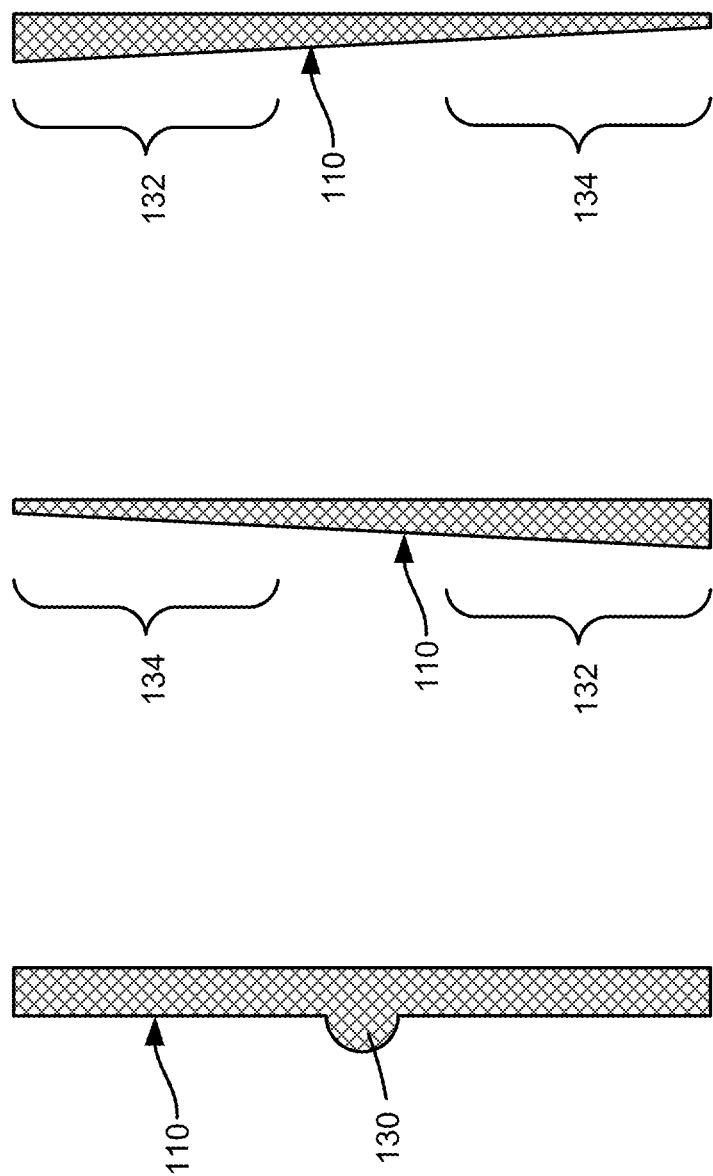

AERODYNAMIC DRAG REDUCTION SYSTEM

CROSS-REFERENCE TO RELATED APPLICATIONS

This application claims the benefit of U.S. Provisional Application No. 61/557,967, filed Nov. 10, 2011, which is incorporated in its entirety herein by reference.

BACKGROUND OF THE INVENTION

1. Field of the Invention

This application relates generally to the reduction of aerodynamic drag experienced by a vehicle and, more specifically, to a system for managing the flow of air about a portion of an over-the-road vehicle to reduce the aerodynamic drag experienced by such a vehicle while underway and improve fuel economy.

2. Description of Related Art

Over-the-road vehicles such as a semi-truck, box truck, intermodal freight vehicle, and other commercial vehicles typically include a tractor that tows a trailer or otherwise transports a cargo hauler. The tractor is a large vehicle engineered for towing power and durability. As such, conventional tractors typically have a large surface area on which drag forces act while the tractor is underway, causing the tractor to experience poor fuel economy, which contributes significantly to the cost of transporting freight from one location to another.

The fuel economy of the tractor further affected by aerodynamic drag is worsened when towing a trailer or otherwise transporting cargo. The rear wheels and suspension assembly of commercial vehicles, which can be located adjacent to a tail end of a trailer are often spaced far enough apart from the tractor that air can enter the space beneath the trailer from each side. This air contacts the rear wheels and suspension system and further contributes to the overall aerodynamic drag experienced by the vehicle.

BRIEF SUMMARY OF THE INVENTION

According to one aspect, the subject application involves an aerodynamic drag reduction apparatus for reducing aerodynamic drag on an over-the-road vehicle while underway. The aerodynamic drag reduction system includes a frame assembly that is adapted to cooperate with a cargo-carrying portion of the over-the-road vehicle to couple the drag reduction apparatus to the over-the-road vehicle. A first skirt is adapted to be supported beneath a first lateral side of the cargo-carrying portion of the over-the-road vehicle, and a first upper rail is provided to be coupled adjacent to an upper region of the first skirt. The first upper rail extends longitudinally along the first skirt and provides the first skirt with an arcuate region between forward and trailing regions of the first skirt. The arcuate region can optionally extend the entire length of the first skirt. Similarly, a first lower rail is provided to be coupled to the first skirt at a vertical elevation between the first upper rail and a bottom region of the first skirt. Like the first upper rail, the first lower rail extends longitudinally along the first skirt.

A second skirt is adapted to be supported beneath a second lateral side, opposite the first lateral side, of the cargo-carrying portion of the over-the-road vehicle. Similar to the first upper rail, a second upper rail that is provided to be coupled adjacent to an upper region of the second skirt to extend longitudinally along the second skirt and establish an arcuate region along the second skirt between forward and trailing regions. A second lower rail is provided to be coupled to the second skirt at a vertical elevation between the second upper rail and a bottom region of the second skirt, also to extend longitudinally along the second skirt.

According to another aspect, the subject application involves an aerodynamic drag reduction apparatus for reducing aerodynamic drag on an over-the-road vehicle while underway. The aerodynamic drag reduction system of the present aspect includes a frame assembly that is adapted to cooperate with a cargo-carrying portion of the over-the-road vehicle to couple the drag reduction apparatus to the over-the-road vehicle. A first skirt is provided and adapted to be supported beneath a first lateral side of the cargo-carrying portion of the over-the-road vehicle. A second skirt is also provided, and is adapted to be supported beneath a second lateral side, opposite the first lateral side, of the cargo-carrying portion of the over-the-road vehicle. The spacing of the first and second skirts establishes a space separating a leading portion of the first and second skirts. A coupling system is provided to couple the first and second skirts to the frame assembly in a manner that allows thermal expansion and contraction of the first and second skirts relative to the frame assembly without warping of material forming an air-deflecting surface of the first and second skirts to an extent that would otherwise occur if the first and second skirts were fixedly connected to the frame assembly.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE SEVERAL VIEWS OF THE DRAWING(S)

The invention may take physical form in certain parts and arrangement of parts, embodiments of which will be described in detail in this specification and illustrated in the accompanying drawings which form a part hereof and wherein:

FIG. 2 is a side view of an illustrative embodiment of a trailer to which an air drag reduction system has been coupled;

FIG. 3 is a bottom view of the trailer shown in FIG. 2;

FIG. 7a is a cross-sectional view of a portion of the trailer taken along line 7-7 in FIG. 3, showing an illustrative embodiment of a coupling mechanism aligned for installation of an air drag reduction system on an underside of a trailer;

FIG. 7b is a cross-sectional view of a portion of the trailer taken along line 7-7 in FIG. 3, showing the coupling mechanism installed on the underside of the trailer;

FIG. 8 is a perspective view of an illustrative embodiment of a skirt segment coupled to top and bottom rails that form a portion of a frame assembly for coupling an air drag reduction system to an underside of a trailer;

Figure 11:
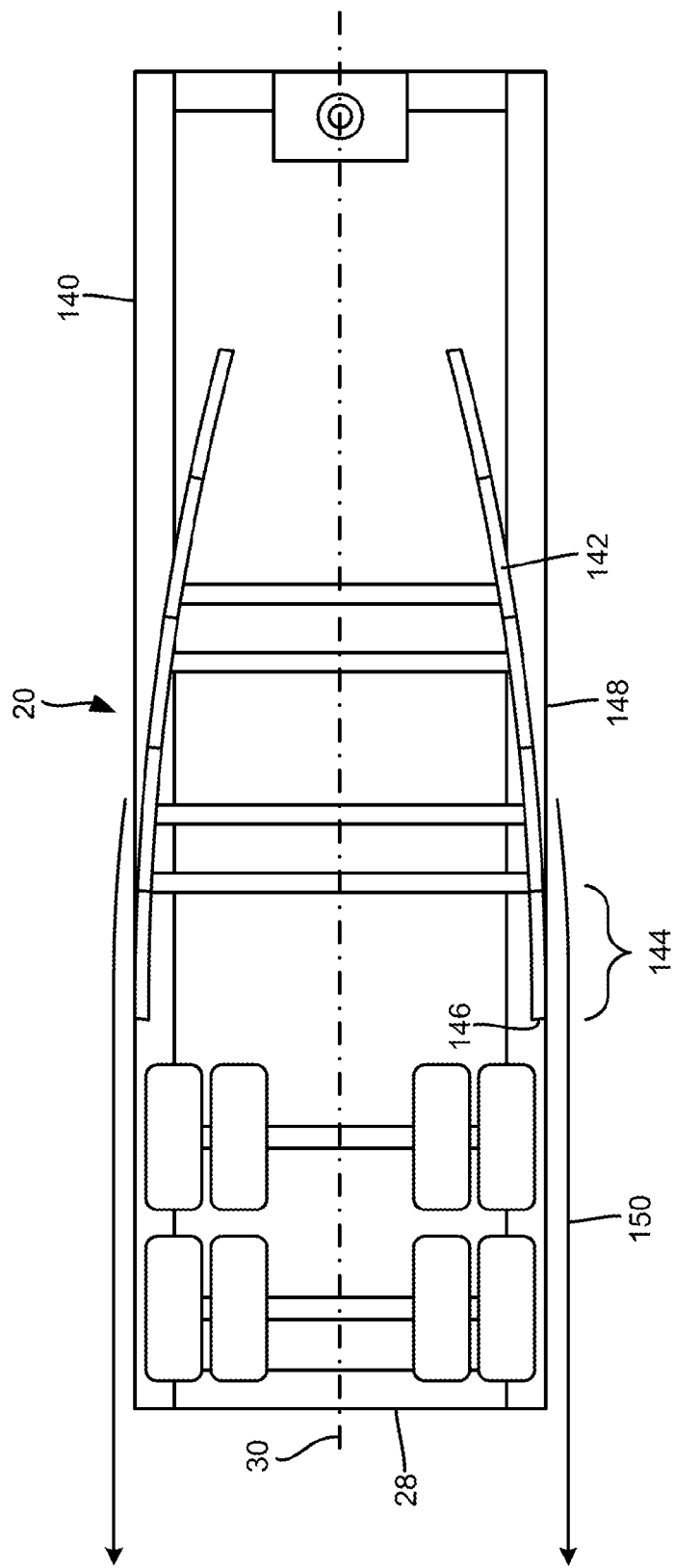
Figure 12:
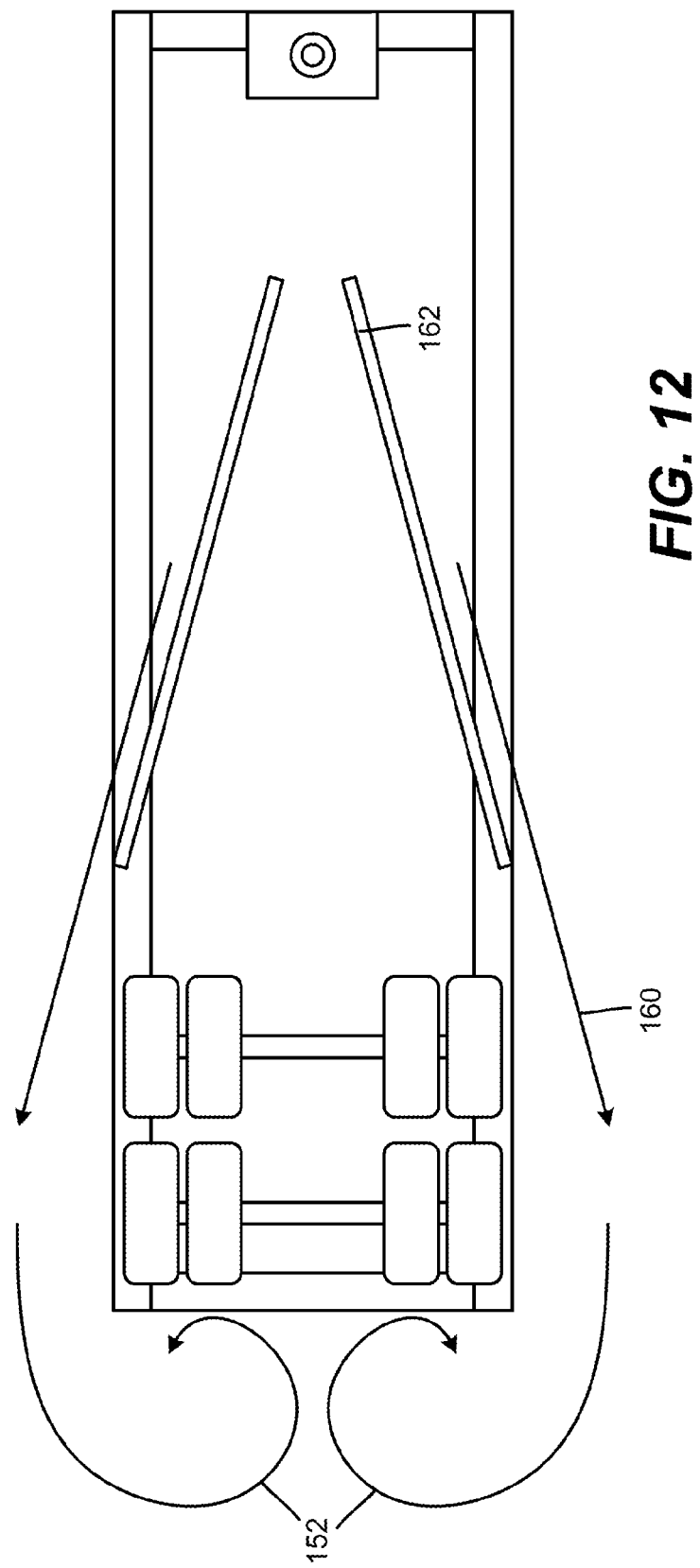
Figure 13:
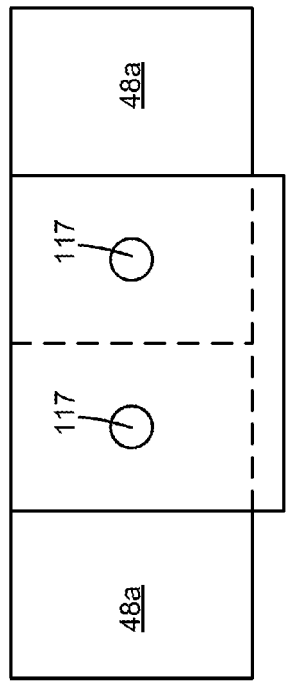
Figure 14:
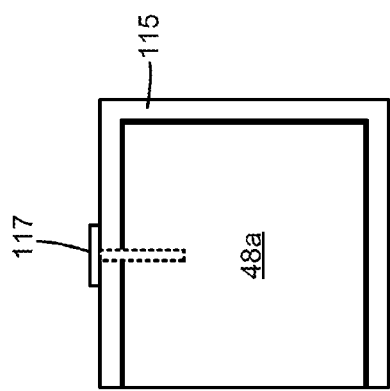
Figure 15:
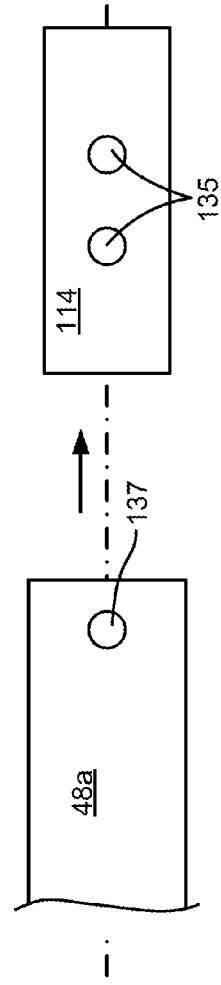
Figure 16:
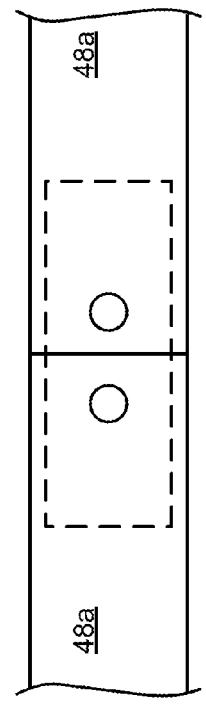

FIG. 9 is a plan view of a skirt segment adjustably coupled to top and bottom rails forming a portion of a frame assembly for coupling an air drag reduction system to an underside of a trailer, wherein the skirt segment is coupled to the rails in a manner that allows the skirt material to expand and contract along a longitudinal axis relative to the rails without deformation of the skirt material that would otherwise result from expansion and contraction of the skirt material with a fixed coupling;

FIG. 10a is a cross-sectional view, taken along line 10-10 in FIG. 9, of the skirt that is to be coupled to a trailer for deflecting at least a portion of an airflow directed toward a portion of an underside of the trailer, wherein the skirt includes an integrally formed rib to enhance structural rigidity of the skirt;

FIG. 10b is a cross-sectional view, taken along line 10-10 in FIG. 9, of the skirt that is to be coupled to a trailer for deflecting at least a portion of an airflow directed toward a portion of an underside of the trailer, wherein the cross section of the skirt is somewhat triangular in shape to provide added rigidity adjacent to a bottom portion of the skirt;

FIG. 10c is a cross-sectional view, taken along line 10-10 in FIG. 9, of the skirt that is to be coupled to a trailer for deflecting at least a portion of an airflow directed toward a portion of an underside of the trailer, wherein the cross section of the skirt is somewhat triangular in shape to provide added rigidity adjacent to a top portion of the skirt;

FIG. 11 shows an illustrative embodiment of an arrangement of a skirt provided to an air drag reduction system, wherein an aft portion of the skirt is substantially parallel with a longitudinal axis of a trailer to which the air drag reduction system is coupled to establish a desired airflow relative to the trailer;

FIG. 12 shows another arrangement of a skirt relative to a trailer that projects a deflected portion of an airflow in a substantially transverse direction relative to a longitudinal axis of the trailer to which the air drag reduction system is coupled, which is believed to promote turbulence adjacent to an aft portion of the trailer;

FIG. 13 is an end view of a top rail within a c-shaped bracket;

FIG. 14 is a top view of a c-shaped bracket joining ends of a top rail provided to adjoining skirt segments;

FIG. 15 shows an alternate embodiment of a joining apparatus for joining ends of a top rail provided to adjacent skirt segments; and FIG. 16 shows the portions of the top rail coupled together with the joining apparatus of FIG. 15.

DETAILED DESCRIPTION OF THE INVENTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Figure 1:
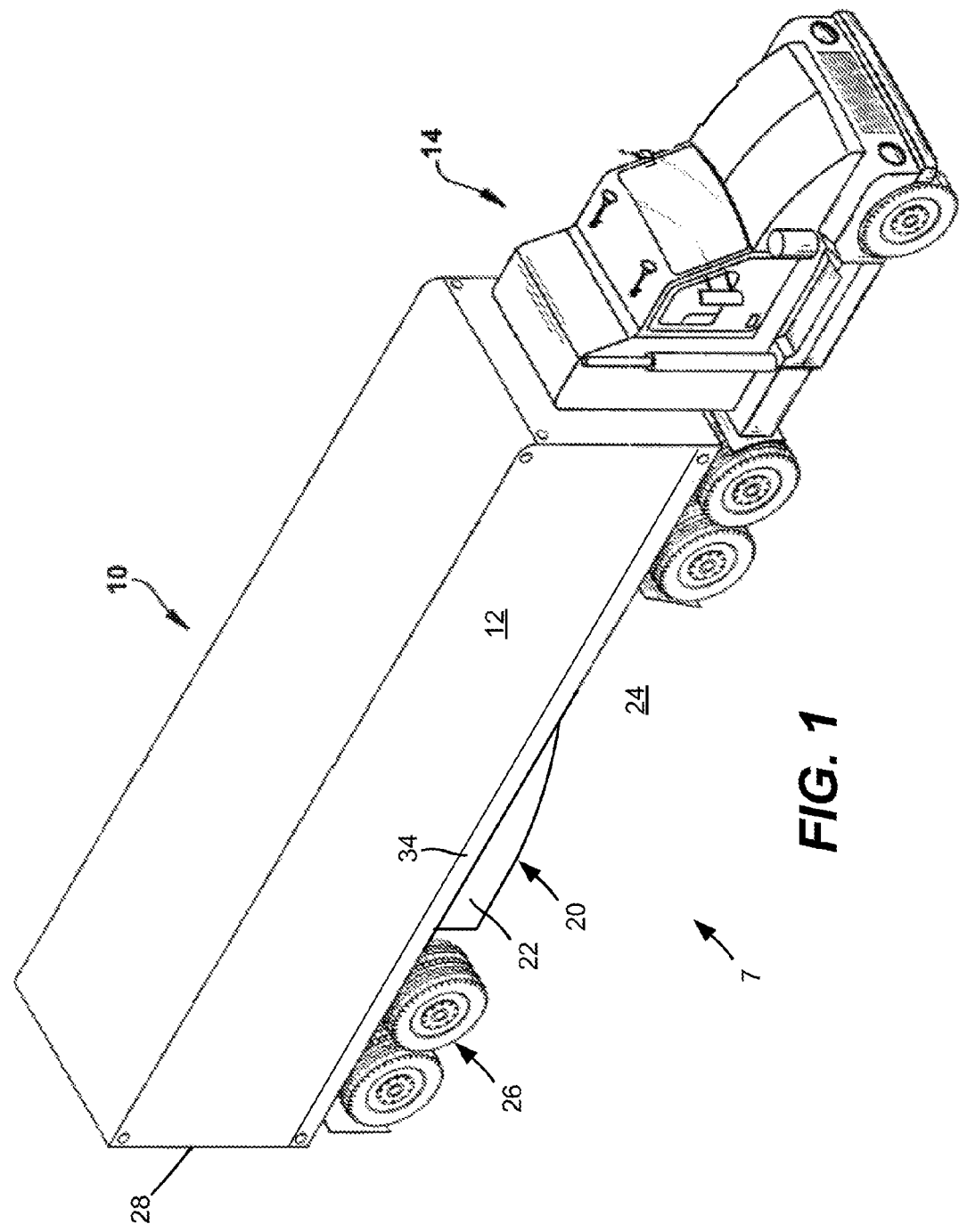
FIG. 1 shows a perspective view of an illustrative embodiment of a commercial truck comprising a tractor and a trailer to which an air drag reduction system has been coupled.
Figure 4:
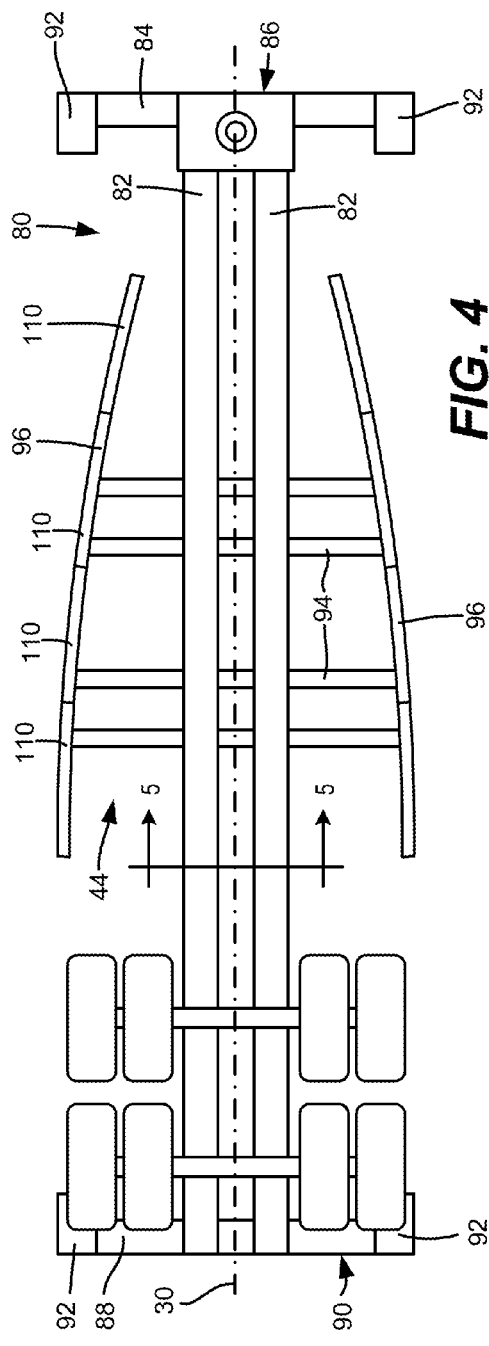
FIG. 4 is a bottom view of an illustrative embodiment of an intermodal trailer to which an air drag reduction system has been coupled.
Figure 5:
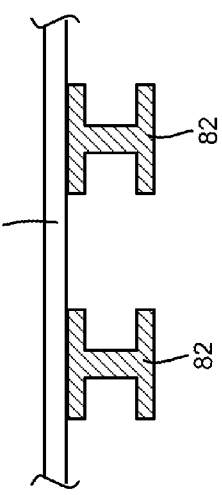
FIG. 5 is a cross-sectional view of a portion of the intermodal trailer taken along line 5-5 in FIG. 4, wherein a frame member of an air drag reduction system is shown resting atop structural beams of the intermodal trailer.
Figure 6:
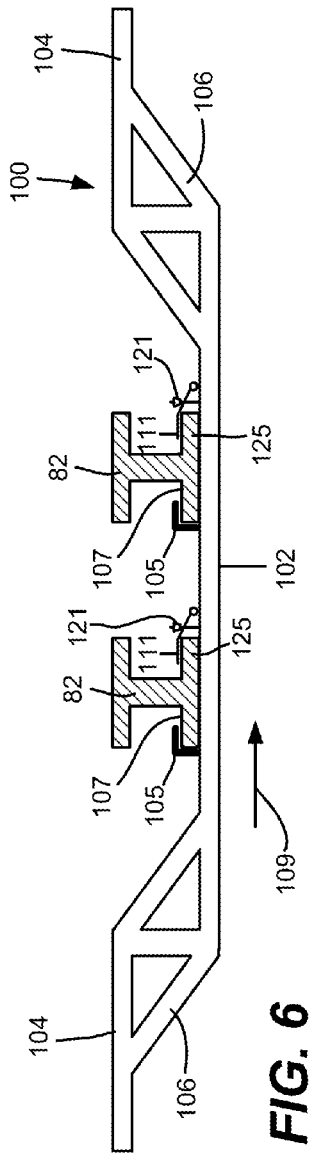
FIG. 6 is a cross sectional view of the structural beams of the intermodal trailer shown in FIG. 4 with an alternate illustrative embodiment of a frame member of an air drag reduction system coupled to the structural beams.

FIG. 1 shows an illustrative embodiment of a truck 7 comprising a tractor 14 operatively connected to a trailer 10 that is to be towed by the tractor 14. The embodiment of the trailer 10 appearing in FIG. 1 has a box-like enclosure 12 that is approximately 53 ft. in length in which cargo is placed to be transported from one location to another. Support for the trailer's floor is provided by structural beams 35 (FIGS. 2 and 3) that extend laterally, and substantially perpendicular to a longitudinal axis 32 of the trailer 10, between metallic frame members 34 that extend lengthwise along the lateral sides the trailer 10 and are coupled to opposite ends of the structural beams 35. Although the embodiment of the trailer 10 in FIG. 1 is described as a 53 ft. enclosed trailer for the sake of brevity, it is understood that the trailer 10 can be any cargo hauling platform, such a trailer attached to a common chassis with the tractor (commonly referred to as a box truck), a trailer with an intermodal chassis as shown in FIGS. 4-6, or any other cargo-hauling trailer used in the commercial transportation of goods.

An air drag reduction system 20 is shown coupled to an underside of the trailer 10 in FIG. 1. The air drag reduction system 20 includes a skirt 22 that extends longitudinally along at least a portion of the trailer 10. The skirt 22 deflects a portion of the airflow entering the space between the underside of the trailer 10 and the road surface 24 while the truck 7 is underway. At least a portion of the deflected airflow would otherwise impinge on the rearward tire assembly 26 supporting the aft portion 28 of the trailer 10 above the road surface 24 if not deflected. Deflected by the skirt 22, the deflected portion of the airflow is directed laterally-outward, beyond externally-exposed sides of the rearward wheel assembly 26, and passes by the trailer 10 in a direction substantially parallel with the trailer 10 as illustrated in FIG. 11, for example.

As shown in FIG. 2, the length L of the skirt 22, when followed along its curvature, is approximately 20 ft.,±6 inches. The skirt 22 can optionally also include a radius of curvature that is at least 12 inches, or much larger such as at least 100 ft., and optionally about 120 ft. According to alternate embodiments, the radius of curvature can be substantially constant over the entire length of the skirt 22. However, the length L of the skirt 22 can be any desired length that allows the skirt 22 to be installed between a leading surface of the forward-most tire 36 of the rearward wheel assembly 26 and the leading surface 38 of the trailer 10. Other embodiments of the skirt 22 can be approximately 16 ft. in length, formed from four skirt segments that are each approximately 4 ft. in length. It follows that the skirts approximately 20 ft. long can be formed from five skirt segments, each approximately 4 ft. in length. According to alternate embodiments, the length L of the skirt 22 can be sufficient to allow the skirt 22 to extend along the longitudinal axis 30 about 15 ft. to about 21 ft., with a leading portion 42 of the skirt 22 being recessed inwardly to extend under the trailer 10, toward a central region of the trailer 10 as shown in FIG. 3. Thus, the leading portions 42 of the skirts 22 arranged along opposite lateral sides of the trailer 10 are closer to each other than other portions of the skirts 22, such as trailing portions 40 for example, while the air drag reduction system 20 is installed on the trailer 10. Accordingly, a distance separating the leading portions 42 of the skirts 22 is greater than a distance separating the trailing portions 40. Yet other embodiments call for the skirt 22 to extend approximately 16 ft. along the axis 30, or approximately 20 ft. along the axis 30. Yet other embodiments include a skirt 22 sized to extend a desired portion along the axis 30 relative to the length of the trailer 10 (i.e., the distance between the leading surface 38 and the aft portion 28 of the trailer 10). For instance, according to an embodiment where the trailer 10 is approximately 53 ft. in length, the skirt 22 can be installed to extend approximately 20 ft.,±6 inches, along the axis 30. For shorter trailers, such as those that are approximately 40 ft. in length, the skirt 22 can have a length of about 16 ft. followed along its curvature.

The skirt 22 can also be sized and installed on the trailer 10 to terminate at a trailing portion 40 that is separated a distance Y ahead of the leading surface of the forward-most tire 36. The distance Y ahead of the leading surface of the forward-most tire 36 allows a portion of the airflow deflected laterally outward from under the trailer to beginning moving in a laterally inward direction, generally towards the space under the trailer 10. As the portion of the deflected airflow begins to move in the laterally inward direct, it can contribute to the aerodynamic drag exerted on the trailer 10. Since the skirt 22 includes an aft region 144 (described below with reference to FIG. 11) that terminates with a portion of the skirt 22 substantially parallel with an external side of the trailer 10, the skirt 22 delays, but does not overshoot, the return of the deflected portion of the airflow in the laterally-inward direction until after the deflected airflow is beyond the rearward wheel assembly 26. It is believed the trailer 10 experiences improved slipstream performance due to the minimization of turbulent eddy formation behind the trailer. In other words, it is believed that the portion of the airflow deflected by the skirts 22 passes the externally exposed sides of the rearward wheel assembly 26 in a bulk flow direction that is substantially parallel with the side of the trailer 10. The distance Y that the trailing portion 40 is ahead of the forward-most tire 36 is about 12 inches to about 24 inches. According to another embodiment, the trailing portion 40 is ahead of the leading surface of the forward-most tire 36 along the axis 30 by approximately 18 inches while the rearward wheel assembly 26 is in the so called "California position". The position of the rearward wheel assembly 26 can be adjusted along the longitudinal axis 30 relative to the box-like enclosure 12, the structural beams 35 and other stationary components of the trailer 10. In the California position, for a tandem axle rearward wheel assembly 26, the rearward wheel assembly 26 is adjusted to position the centerline of the rearmost axle at a location approximately 146 inches,±3.0 inches, forward along the longitudinal axis 30 from the aft portion 28 of the trailer 10.

Likewise, the leading portion 42 of the skirt 22, which is located upstream of the trailing portion 40 in the airflow while the truck 7 is underway, can be set back a distance X from the leading surface 38 of the trailer 10. For example, the leading portion 42 can be set back a distance X of at least about 12 ft., or optionally about 16 ft. to about 20 ft. from the leading surface 38 of the trailer 10. Other embodiments call for the leading portion 42 to be set back a distance X of about 16 ft., 2 in. from the leading surface 38 of the trailer 10 to allow for the portion of deflected airflow to again travel in a laterally inward direction after passing the rearward wheel assembly 26.

As shown in FIG. 3, the underside of the trailer 10 includes the exposed laterally-oriented structural beams 35. A frame assembly 44 of the air drag reduction system 20 couples the skirt 22 to the structural beams 35. For the embodiment shown in FIG. 3, the frame assembly 44 includes cross members 46 that extend between the top rails 48a (FIG. 8) supporting the skirt 22 on each side the air drag reduction system 20. Two sets of cross members 46 are shown in the embodiment appearing in FIG. 3, with each set including a pair of cross members 46. At least one cross member 46 from at least one of the sets can be adjustably coupled to the top rails 48a to allow that cross member 46 to be adjusted forward and rearward directions along axis 30 when the air drag reduction system 20 is supported in position under the trailer 10 for installation. For example, the adjustable cross member 46 can optionally be supported on a track coupled to the stationary cross member 46 in the same set, allowing for adjustment of the adjustable cross member relative to the other cross member 46. According to alternate embodiments, a receiver portion forming part of a fastening system 47 described below can be adjustably coupled to one of the cross members 46 in a manner that allows the receiver portion to be adjusted fore and aft along the longitudinal axis 30 relative to the other cross member 46. Regardless of the implementation, a distance between the receiver portion and a locking mechanism allows the fastening system to cooperate with structural beams 35 or other structural features of the trailer 10 having different sizes, and thereby couple the drag reduction system 20 to the trailer 10.

One or more of the cross members 46 can be provided with a fastening system 47, an example of which is illustrated in FIGS. 7a and 7b, to secure the frame assembly 44 to the structural beams 35 or other portion of the underside of the trailer 10. FIGS. 7a and 7b are cross-sectional views of a pair of cross members 46 and one of the structural beams 35 taken along line 7-7 in FIG. 3 to illustrate a method of coupling and removing the frame assembly 44 to and from the trailer 10. However, each of the pairs of cross members 46 appearing in FIG. 3 can optionally be provided with the fastening system such as that described in FIGS. 7a and 7b. The fastening system in FIG. 7a includes a catch portion 50 that, along with the cross member 46, defines a generally C-shaped recess 52 that can receive a flange portion 62 of the structural beam 35. The other cross member 46 in FIG. 7a supports a hinge 54 that pivotally couples a clamp 56 to the cross member 46. The clamp 56 is located adjacent to a locking device 60, which can also be supported by the cross member 46, that is operable to maintain the clamp 56 in a closed orientation to interfere with opening of the clamp 56 and removal of the frame assembly 44 from the structural beam 35 or other portion of the trailer 10. According to the illustrative embodiment shown in FIGS. 7a and 7b, the locking device 60 includes a threaded member 64 that can receive a locking nut 58 threaded to be compatible with the threaded member 64.

To install the frame assembly 44 using the embodiment of the fastening system 47 shown in FIGS. 7a and 7b, each pair of cross members 46 can be elevated into position such that the two opposing cross members 46 in each pair are separated by a flange portion 62 of the structural beam 35. According to one embodiment, the first cross member 46 in the forward pair of cross members 46 can optionally be fixedly coupled to the top rails 48a, thereby preventing adjustment of the first cross member 46 relative to the top rails 48a in the forward and rearward directions. At least one, and optionally both of the cross members 46 in the relatively rearward pair of cross members 46 can be adjustably coupled to the top rails 48a, allowing the rearward pair of cross members to be repositioned as needed for installation on a trailer 10 having structural members 35 that are not equally, or conventionally spaced. Once in position, the frame assembly 44, including the cross members 46, can be moved rearward (i.e., toward the aft portion 28 of the trailer 10) in the direction of arrows 66 in FIG. 7a until the flange portion 62 is received within the recess 52 defined between the cross member 46 and the catch portion 50. With the flange portion 62 received within the recess 52, the clamp 56 is pivoted in the direction of arrow 68 to contact the flange portion 70 of the structural beam 35. The locking nut 58 is then threaded onto the threaded member 64 until it, or another intermediate structure such as a washer for example, makes contact with the clamp 56. Once the lock nut 58 is tight, as shown in FIG. 7b, the clamp 56 prevents forward movement of the cross members 46 relative to the structural beam 35 as required for removal of the frame assembly 44 from the trailer 10.

The position of the cross members 46 can optionally be made adjustable relative to each other, or relative to another portion of the frame assembly 44. Adjustment of one or more of the cross members 46 forward and/or rearward allow the frame assembly 44 to be coupled to trailers 10 having different configurations. For example, suitable adjustment of the cross members 46 can be provided to allow the frame assembly 44 to be coupled to trailers 10 having structural beam 35 spacing from about 7 inches to about 15 inches, on center.

The frame assembly 44 can optionally be coupled to the skirts 22 to be supported adjacent to each lateral side of the trailer 10 before the frame assembly 44 is coupled to the underside of the trailer 10. According to such an embodiment, the entire air drag reduction system 20 can optionally be installed and removed as a unit. Thus, the air drag reduction system 20 can optionally be removed from one trailer 10 and installed on a different trailer quickly and efficiently. Fleet operators would not be required to permanently install an air drag reduction system 20 onto each individual trailer, but would be able to quickly move the air drag reduction system 20 from one trailer 10 to another.

FIG. 4 shows an illustrative embodiment of an intermodal trailer 80 that is adapted to receive stackable shipping containers from one mode of transportation (e.g., freighter, train, etc. . . . ) to be towed over public roads to be delivered to their destination. The intermodal trailer 80 includes one or more, or optionally a plurality of structural beams 82 that extend longitudinally along the longitudinal axis 30. Unlike the trailer 10 described above, the intermodal trailer 80 lacks the transverse structural members 35 that extend in a widthwise direction across the trailer 10. Instead, the intermodal trailer 80 includes a forward beam 84 at a leading end 86 and a rearward beam 88 extending laterally across an aft end 90 of the intermodal trailer 80. A receiver 92 is provided to each end of both the forward and rearward beams 84, 88. Each receiver 92 receives a corner of the shipping container lowered into place by a crane, and locks the shipping container in place until released at a time when the shipping container is to be removed from the intermodal trailer 80.

To couple the frame assembly 44 to the intermodal trailer 80 in the absence of the structural beams 35 discussed above, one embodiment of the frame assembly 44 includes cross members 94 that extend between rails 48 that support the skirts 96. Rather than suspending the cross members 94 from the underside of the intermodal trailer 80, the cross members 94 are adapted to rest on top of the structural beams 82 extending longitudinally along the axis 30, as shown in the bottom view of FIG. 4 and the cross-sectional view of FIG. 5, taken along line 5-5 in FIG. 4. The cross members 94 can optionally include a clamp or other fastening mechanism to secure the frame assembly 44 in place, the cross members 94 can optionally be urged against the structural beams 82 by the force of gravity, the cross members 94 can optionally be maintained in place between the structural beams 82 and a shipping container supported by the intermodal trailer 80, any combination thereof, and the like.

FIG. 6 shows an alternate embodiment of a cross member 100 suspended from the structural beams 82 along an underside of the intermodal trailer 80. The embodiment shown in FIG. 6 is a permanent installation, as opposed to the removable installation shown in FIGS. 4 and 5. In FIG. 6, a central portion of the cross member 100 is releasably-coupled to an underside of each of the structural beams 82 using a fastening system 101 similar to that described above with reference to FIGS. 7a and 7b. Briefly, catch portions 105 are elevated up to, and slid over a flange portion 107 of each of the structural beams 82 by moving the cross member 100 in the direction of arrow 109 for the embodiment in FIG. 6. Once the catch portions 105 are properly positioned over the flange portions 107, a clamp 111 and locking device 121 are secured over the opposite flange portions 125, thereby securing the cross member 100 in place. Elevated arm portions 104 are approximately equal in elevation to the top of the structural beams 82. Gussets 106 brace the elevated arm portions, which cooperate with the rails 48 discussed below to support the skirts 96 adjacent to the lateral sides of the intermodal trailer 80.

FIG. 8 shows an illustrative embodiment of a skirt segment 110 that can be coupled adjacent to an end of the cross members 46, 94 to, along with additional skirt segments 110, collectively form the skirts 22, 96. Each skirt segment 110 is coupled to at least a top rail 48a of the frame assembly 44. The top rail 48a can be formed from 1 inch square metal tubing, and is supported adjacent to the end of the cross members 46, and can have an arcuate region, or be generally arcuate in shape over its entire length to establish the desired radius of curvature of the material forming the air deflecting surface while that material is coupled to the top rail 48a and/or bottom rail 48b as described herein. Other embodiments of the top rail 48a can be formed from any suitably-rigid material, in any desired cross-sectional shape to maintain the shape of an arcuate region of the skirt when coupled to the top rail 48a. The embodiment of the skirt segment 110 shown in FIG. 8 can be releasably coupled to the underside of the trailer 10 with a suitable fastening system, such as that described with reference to FIGS. 7a and 7b, provided directly to the top rail 48a instead of the cross members 46. As such, the top rail 48a is provided with a plurality of apertures 112 for receiving a catch portion 50 and locking device 60 at a plurality of locations along the top rail 48a to accommodate trailers 10 with different structural beam 35 spacing. The catch portion 50 and locking device 60 can be at least partially received within the apertures 112 to be aligned with the desired structural beam 35 to be used to secure the skirt segment 110 to the structural beams 35 of the trailer 10. By forming a plurality of apertures 112 in the top rail 48a, such as at one (1) inch intervals or other suitable spacing, the top rail 48a can be made compatible with a plurality of differently-configured trailers.

The embodiment shown in FIG. 8 also includes a bottom rail 48b. The bottom rail 48b, like the top rail 48a, can be formed from square metal tubing, but can optionally be formed with smaller dimensions to save on material costs. For instance, the bottom rail 48b can optionally be formed from ¾ inch metal tubing. Like the top rail 48a, alternate embodiments of the bottom rail 48b can formed from any suitably-rigid material that will maintain its arcuate shape and provide structural support to a mid region of the skirt segment 110 to which it is coupled. Thus, while the truck 7 is underway, the structural support provided by the bottom rail 48b to the mid region of the skirt segment 110 is sufficient to allow the skirt segment 110, as a whole, to withstand the force imparted thereon by the airflow being deflected and maintain its arcuate shape. The bottom rail 48b can be elevated a height H from the lowermost, or bottom region 49 of the material forming the air deflecting surface of the skirt segment 110. Thus, the bottom rail 48b is disposed at a vertical elevation, while the skirt segment 110 is installed on the trailer 10, at a mid region of the material forming the air-deflecting surface of the skirt segment 110 between the top rail 48 and the bottom region 49. The height H can be chosen as any value that provides adequate support to the bottom region 49 of the material forming the air-deflecting surface of the skirt segment 110, and prevents the bottom region 49 from bending inward, under the trailer 10 to an extent that the bottom region 49 approaches an orientation parallel with the road surface (or underside of the trailer 10). Although minimal bending of the bottom region 49 is tolerable, the height H can be chosen to allow the material forming the air-deflecting surface of the skirt segment 110 to maintain substantially the same shape as when not exposed to the airflow being deflected, and substantially-vertical orientation when subjected to the airflow being deflected while the truck 7 is underway, even at highway speeds. In other words, the height H can be chosen such that the shape of the material forming the air-deflecting surface of the skirt segment 110 is substantially the same when the truck 7 is underway as when the truck is stationary. For example, the height H can be any value such as approximately half the vertical height of the material forming the air-deflecting surface of the skirt segment 110. According to alternate embodiments, the height H can be at least ten (10 in.) inches, or at least twelve (12 in.) inches, or at least sixteen (16 in.) inches, or at least twenty (20 in.) inches. Elevating the bottom rail 48b in this manner allows the bottom region 49 to deform if the bottom region 49 makes contact with a foreign object such as the road surface, railroad tracks over which the truck 7 is traveling, or other object, for example, without permanently deforming the material forming the air-deflecting surface of the skirt segment 110 or otherwise damaging the air drag reduction system 20.

The bottom rail 48b is supported by a brace 116 that extends at an approximate 45° or other suitable angle from horizontal to the structural beam 35, to which it is coupled using a reversible beam clamp, and the like. The length of the brace 116 can be selected along with the angle from horizontal to position a connector portion 51 that is to be coupled to the beam 35 at approximately the same vertical elevation as an upper surface 55 of the top rail 48a. The embodiment of the skirt segment 110 shown in FIG. 8 includes a single brace 116 extending from the bottom rail 48b, but alternate embodiments can include a plurality of braces 116 extending from the bottom rail 48b of at least one, or optionally each skirt segment 110. Yet other embodiments can include a different number of braces 116 extending from the bottom rail 48b of a plurality of different skirt segments 110 included in a skirt 22. The brace 116 and bottom rail 48b combination provide rigidity to a lower region of the skirt segment 110 that resists forces imparted thereon by the airflow while the truck 7 is underway. The brace 116 can optionally be formed of a substantially rigid metal, metal alloy, plastic or synthetic composition, or a combination thereof. The brace 116 can be formed of a material having suitable rigidity and strength to prevent, or at least minimize deflection of the brace 116, even when the lower region 49 of the material forming the air-deflecting surface of the skirt segment 110 makes contact with a foreign object. The brace 116 can optionally be formed to have a cross-sectional shape that is substantially I, H or L shaped to further resist bending or other deflection of the brace 116. Instead of damaging the brace 116, such contact between the lower region 49 and the foreign object causes the lower region 49 to substantially-elastically deform to avoid damaging the rest of the air drag reduction system 20. For embodiments where the skirt 22 is formed from a plurality of skirt segments 110, damage to any of the skirt segments 110 can be addressed by replacing only the damaged skirt segments 110, but leaving the undamaged skirt segments 110.

FIG. 9 shows an alternate embodiment of the skirt segment 110. As shown, the skirt segment 110 includes a plurality of elongated, and optionally ovular-shaped apertures 118 that are to receive a post 120, bolt or other suitable member extending from the top and/or bottom rail 48a, 48b, shown using hidden lines in FIG. 9. Each post 120 can include an enlarged head that does not fit through the aperture 118 through which the post 120 extends. The end of the post 120 extending through the aperture 118 can cooperate with the top and/or bottom rail 48a, 48b, and optionally a compatible fastener such as a nut, pin, head or the like, to interfere with removal of the post 120 from the aperture 118. The dimensions of the apertures 118 are suitable to permit relative movement of the skirt segment 110 relative to the posts 120 in a longitudinal direction of the apertures 118, thereby allowing the material forming the air-deflecting surface of the skirt segment 110 to move relative to the top and/or bottom rails 48a, 48b. Allowing movement of the skirt segment 110 relative to the top and/or bottom rails 48a, 48b in the longitudinal direction enables materials susceptible to high levels of thermal expansion to be used for the skirt segments 110 without causing such materials to warp or otherwise deform to the extent that would occur if the skirt segments 110 were fixedly secured to the top and/or bottom rails 48a, 48b. For example, materials such as ultra-high-molecular-weight polyethylene (e.g., having a molecular weight within a range of approximately 2 million to approximately 6 million) can be used as the material forming an air-deflecting surface of the skirt segments 110 despite the susceptibility of that material to thermal expansion. An ultra-high-molecular-weight polyethylene air-deflecting surface is an example of a material available for use due to the presence of the apertures 118 without the consequences resulting from thermal expansion that may result from a fixed connection between the material forming the air-deflecting surface and the rails 48a, 48b. According to other embodiments, the apertures 118 can allow the use of a combination of materials having a substantial difference between their respective coefficients of linear thermal expansion ($\alpha$). For instance, the rails 48a, 48b can optionally be formed from aluminum, having a coefficient ($\alpha$) of approximately $12.3 \times 10^{-6}$ in./(in.×° F.), and the skirt material coupled to the rails 48a, 48b can optionally be formed from polyvinyl chloride, which has a coefficient ($\alpha$) of approximately $28 \times 10^{-6}$ in./(in.×° F.). Generally, the coefficient of linear thermal expansion ($\alpha$) of one of the material coupled to the rails 48a, 48b and the rails 48a, 48b themselves is at least about one and a half (1.5×) times (i.e., at least 150%) the coefficient of linear thermal expansion ($\alpha$) of the other. In other words, the coefficient of linear thermal expansion ($\alpha$) of the material coupled to the rails 48a, 48b can be at least one and a half (1.5×) times, or 150% greater than the coefficient of linear thermal expansion ($\alpha$) of the rails 48a, 48b, or vice versa.

The apertures 118 are elongated substantially parallel with a length (e.g., the longer dimension) of the material forming the air deflecting surface of the skirt segment 110 because the length of the material in this direction can result in substantial expansion and/or contraction relative to any such expansion and/or contraction that occurs in the height direction (e.g., vertical in FIGS. 8 and 9). The apertures 118 can be sufficiently long to accommodate a full range of expansion and/or contraction differences between the material forming an air-deflecting surface of the skirt segments 110 relative to the rails 48a, 48b or other frame structure to which the material is coupled, optionally over a range of temperatures in which the air drag reduction system 20 is expected to be used. For instance, the apertures 118 can be suitably long to accommodate expansion and/or contraction differences over a temperature range from about −100° F. to about 140° F.

According to alternate embodiments, instead of forming elongated apertures 118 in the material forming the air-deflecting surface of the skirt segments 110 and extending a post there through, a plurality of posts can be fixed to, and project from fixed locations on the material forming the air-deflecting surface of the skirt segments 110. Such posts can optionally extend through an elongated aperture formed in the top and or bottom rails 48a, 48b. Just as for the previous embodiment, thermal expansion and contraction of the material forming the air-deflecting surface of the skirt segments 110 causes the posts to travel along the length of the elongated apertures, thereby avoiding warping of the material that would otherwise occur if the material was fixedly connected to the rails 48a, 48b.

The skirt segments 110 in FIGS. 8 and 9 can have dimensions that allow skirt segments 110, all of the same dimensions, to be assembled to collectively form different-sizes of skirts 22, 96. For example, the skirt segment 110 can be approximately 4 ft. in length. As shown in FIG. 3, five skirt segments 110 are assembled to form the skirts 22 having a length of approximately 20 ft., which is suitable for use on a 53 ft. trailer 10. Likewise, FIG. 4 shows four skirt segments 110 arranged together to form a skirt 96 having a length of approximately 16 ft., which is suitable for use with the alternate trailer 80, which is less than 53 ft. in length, appearing in FIG. 4.

The skirt segments 110 can be joined together according to any suitable technique. An illustrative embodiment of a connector for joining skirt segments 110 is shown in FIGS. 13 and 14. In FIG. 13, a portion of a plurality of skirt segments 110a, 110b (FIG. 14), viewed on end in FIG. 13, extend into a substantially C-shaped recess defined by a C-channel clamp 115. A fastener 117 (partially shown in hidden lines) such as a rivot, screw, bolt, etc. . . . extends through both the clamp 115 and the skirt segments 110a, 110b, thereby interfering with removal of the skirt segments 110a, 110b from the clamp 115. However, it is understood that any suitable device for joining two or more skirt segments 110 together can be used without departing from the scope of the present invention.

An alternate embodiment for joining skirt segments 110 is illustrated in FIGS. 15 and 16. According to such an embodiment, a joining section 114 of square tube that can be at least partially received with in the square tube of the top rail 48a is provided with a pair of apertures 135 formed therein. For instance, the top rail 48a of each skirt segment 110 can be formed from 1 inch square tube, and the joining section 114 can be formed from ¾ inch square tube. The ends of the top rail 48a of each skirt segment 110 to be joined are placed over the joining section 114 such that apertures 137 in each top rail 48a are aligned with the apertures 135 in the joining section 114, as shown in FIG. 16. A pin, bolt or other suitable fastener can be inserted through the aligned apertures 135, 137 to couple the top rails 48a together.

Forming skirts 22, 96 from a plurality of modular skirt segments 110 as shown in FIGS. 3 and 4 also allows for replacement of a damaged skirt segment 110, rather than replacement of an entire skirt 22, 96. Replacement of individual skirt segments 110 instead of the entire skirts 22, 96 is cost efficient and allows for quick repairs compared to removing and replacing the entire skirts 22, 96.

The material selected for the skirt segments 110 can optionally be blended with the color of choice, or otherwise incorporate the color of choice throughout. When the material used for the skirt segments 110 is scratched or otherwise damaged, the color of choice is still visible and the damage does not stand out like it would if the color of choice was merely a surface coat and was damaged to reveal a different color underneath.

The material used for the skirt segments 110 can also optionally include a mark indicative of a quality of the skirts 22, 96, the skirt segments 110, or a combination thereof. For example, the mark can be a certification mark indicating that the skirts 22, 96 have been tested and were found to improve fuel economy by a predetermined percentage on a test vehicle. The mark can optionally be indelibly provided to the skirt segment 110. For example, the mark can be integrally molded as part of the skirt segment 110 itself. According to alternate embodiments, the mark can optionally be impressed, branded or otherwise permanently formed in or on the skirt segments 110.

FIGS. 10a, 10b and 10c are cross-sectional views of the skirt segment 110 taken along line 10-10 in FIG. 9. The cross section shown in FIG. 10a includes a rib 130 molded lengthwise along the skirt segment 110. The rib 130 provides the skirt segment 110 with enhanced rigidity and support, possibly allowing for omission of the brace 116 that offers support to the bottom of the skirt segment 110.

The cross sections shown in FIGS. 10b and 10c each include a region 132 of added material thickness and a region 134 of lesser material thickness. In FIG. 10b, the region 132 with added thickness offers enhanced rigidity and durability to the bottom portion of the skirt segment 110. Since the top rail 48a offers sufficient support adjacent to the top of the skirt segment 110, there is less need for the added material thickness in the region 134 adjacent to the top of the skirt segment 110. Likewise, for embodiments where there is less need for the added rigidity and support adjacent to the bottom of the skirt segment, the region 134 of lesser material thickness can be so located, as shown in FIG. 10c. Minimizing material thickness reduces material consumption and offers potential cost savings.

FIG. 11 illustrates positioning of the air drag reduction system 20 on the underside of a trailer 140, with the structural beams 35 removed for clarity. For any of the embodiments described herein, the skirt 142 can optionally include a region 144 adjacent to a trailing end 146 of the skirt 142 that is substantially parallel with the side 148 of the trailer 140, the axis 30, or both. By allowing the curvature of the skirt 142 to reach an end in parallel with the axis 30, side of the trailer 148, or both, a substantially laminar deflected airflow 150 is believed to result. It is also believed that the substantially laminar deflected airflow 150 minimizes formation of turbulent eddies 152 (FIG. 12) adjacent to the aft portion 28 of the trailer 140. In contrast, it is believed that the deflected airflow 160 produced by a non-substantially-parallel skirt 162 as shown in FIG. 12 promotes formation of such turbulent eddies 152, and projects water from the road surface into the path of auto traffic.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used herein, such term is intended to be inclusive in a manner similar to the term "comprising" as "comprising" is interpreted when employed as a transitional word in a claim.

What is claimed is:

1. An aerodynamic drag reduction apparatus for reducing aerodynamic drag on an over-the-road vehicle while underway, the aerodynamic drag reduction system comprising:
a frame assembly that is adapted to be coupled to a cargo-carrying portion of the over-the-road vehicle;
a first skirt adapted to be supported by the frame assembly beneath a first lateral side of the cargo-carrying portion of the over-the-road vehicle;
a first upper rail that is to be coupled adjacent to an upper region of the first skirt to extend longitudinally along the first skirt and provide the first skirt with an arcuate region between a forward region and a trailing region of the first skirt;
a first lower rail that is to be coupled to the first skirt at a vertical elevation between the first upper rail and a bottom region of the first skirt to extend longitudinally along the first skirt;
a second skirt adapted to be supported by the frame assembly beneath a second lateral side, opposite the first lateral side, of the cargo-carrying portion of the over-the-road vehicle;
a second upper rail that is to be coupled adjacent to an upper region of the second skirt to extend longitudinally along the second skirt and provide the second skirt with an arcuate region between a forward region and a trailing region of the second skirt; and
a second lower rail that is to be coupled to the second skirt at a vertical elevation between the second upper rail and a bottom region of the second skirt to extend longitudinally along the second skirt.

2. The aerodynamic drag reduction apparatus of claim 1 further comprising:
a first brace that is to extend between the first lower rail and an underside of the cargo-carrying portion; and
a second brace that is to extend between the second lower rail and the underside of the cargo-carrying portion.

3. The aerodynamic drag reduction apparatus of claim 1, wherein the first and second upper rails and the first and second lower rails comprise an arcuate shape, having a radius of curvature of at least 12 inches.

4. The aerodynamic drag reduction apparatus of claim 1, wherein the first and second skirts each comprise a plurality of equal-length skirt segments coupled together.

5. The aerodynamic drag reduction apparatus of claim 4, wherein each of the first and second upper rails and each of the first and second lower rails are formed from a plurality of rail segments coupled together, and each of the skirt segments comprises an upper rail segment and a lower rail segment.

6. The aerodynamic drag reduction apparatus of claim 1, wherein the frame assembly comprises a cross member extending between the first and second skirts, the cross member comprising a connector for coupling the aerodynamic drag reduction apparatus to the cargo-carrying portion of the truck.

7. The aerodynamic drag reduction apparatus of claim 6, wherein the connector comprises an adjustable clamp for releasably coupling the frame assembly to the cargo-carrying portion of the truck.

8. The aerodynamic drag reduction apparatus of claim 1, wherein each of the first and second skirts is approximately 20 ft. long.

9. The aerodynamic drag reduction apparatus of claim 1, wherein each of the first and second skirts is approximately 16 ft. long.

10. An aerodynamic drag reduction apparatus for reducing aerodynamic drag on an over-the-road vehicle while underway, the aerodynamic drag reduction system comprising:
a frame assembly that is adapted to be coupled to a cargo-carrying portion of the over-the-road vehicle;
a first skirt adapted to be supported by the frame assembly beneath a first lateral side of the cargo-carrying portion of the over-the-road vehicle;
a second skirt adapted to be supported by the frame assembly beneath a second lateral side, opposite the first lateral side, of the cargo-carrying portion of the over-the-road vehicle, establishing a space separating a leading portion of the first and second skirts; and
a coupling system that is configured to couple the first and second skirts to the frame assembly in a manner that allows thermal expansion and contraction of the first and second skirts relative to the frame assembly without warping of material forming an air-deflecting surface of the first and second skirts to an extent that would occur if the first and second skirts were fixedly connected to the frame assembly, wherein the first skirt and the second skirt, while coupled to the frame assembly by the coupling system, are expandable and contractible in a longitudinal direction relative to the frame assembly, wherein each of the first and second skirts is formed, at least in part, from a material with a coefficient of linear thermal expansion in the longitudinal direction that is greater than a coefficient of thermal expansion of a material used to form the frame assembly.

11. The aerodynamic drag reduction apparatus of claim 10, wherein the coupling system comprises:
a plurality of elongated apertures formed in the material forming the air-deflecting surface of the first and second skirts; and
a post that extends through each of the plurality of elongated apertures and at least partially through a portion of the frame assembly to allow longitudinal adjustment of the material forming the air-deflecting surface relative to the frame assembly.

12. The aerodynamic drag reduction apparatus of claim 10, wherein:
the first skirt comprises a plurality of first skirt segments that are arranged to collectively form the first skirt, and each of the first skirt segments comprise a plurality of elongated apertures formed in the material forming the air-deflecting surface of the first skirt;
the second skirt comprises a plurality of second skirt segments that are arranged to collectively form the second skirt, and each of the second skirt segments comprise a plurality of elongated apertures formed in the material forming the air-deflecting surface of the second skirt; and
the coupling system comprises a post that extends through each of the plurality of elongated apertures and at least partially through a portion of the frame assembly to allow longitudinal adjustment of the material forming the air-deflecting surface of the first and second skirt portions relative to the frame assembly.

13. The aerodynamic drag reduction apparatus of claim 10, wherein the material forming the air-deflecting surface of the first and second skirts comprises polyethylene with a molecular weight within a range of approximately 2 million to approximately 6 million.

14. The aerodynamic drag reduction apparatus of claim 10, wherein each of the first and second skirts comprises an arcuate region comprising a radius of curvature of at least 12 inches.

15. The aerodynamic drag reduction apparatus of claim 10, wherein each of the first and second skirts comprises a length within a range from approximately 15 ft. to approximately 21 ft.

16. The aerodynamic drag reduction apparatus of claim 11, wherein each of the elongated apertures extends a greater extent along the longitudinal direction of the first and second skirts than along a transverse direction of the first and second skirts.

\* \* \* \* \*